(12) United States Patent
Okamoto et al.

(10) Patent No.: US 7,508,438 B2
(45) Date of Patent: Mar. 24, 2009

(54) DIGITAL CAMERA HAVING A BRACKETING CAPABILITY

(75) Inventors: Teppei Okamoto, Saitama (JP); Hisashi Tatamiya, Saitama (JP)

(73) Assignee: Hoya Corporation, Tokyo (JP)

( * ) Notice: Subject to any disclaimer, the term of this patent is extended or adjusted under 35 U.S.C. 154(b) by 592 days.

(21) Appl. No.: 11/210,680

(22) Filed: Aug. 25, 2005

(65) Prior Publication Data

US 2006/0044444 A1 Mar. 2, 2006

(30) Foreign Application Priority Data

Aug. 30, 2004 (JP) ............................. P2004-250438

(51) Int. Cl.
*H04N 5/222* (2006.01)
(52) U.S. Cl. ............................. 348/333.05; 348/333.01; 348/333.02; 348/222.1; 348/229.1
(58) Field of Classification Search ............ 348/333.05, 348/333.04
See application file for complete search history.

(56) References Cited

U.S. PATENT DOCUMENTS 5,043,816 A * 8/1991 Nakano et al. ......... 348/333.01

| | | | |
|---|---|---|---|
| 2003/0076312 A1* | 4/2003 | Yokoyama | 345/204 |
| 2003/0081140 A1* | 5/2003 | Furukawa | 348/362 |
| 2003/0090528 A1* | 5/2003 | Masuda et al. | 345/838 |
| 2005/0089218 A1 | 4/2005 | Chiba | |
| 2005/0195293 A1 | 9/2005 | Kobayashi et al. | |

FOREIGN PATENT DOCUMENTS

| | | |
|---|---|---|
| JP | 2000-125185 | 4/2000 |
| JP | 2003-087608 | 3/2003 |

OTHER PUBLICATIONS

English language Abstract of JP 2000-125185.
English language Abstract of JP 2003-087608.

* cited by examiner

*Primary Examiner*—David L Ometz
*Assistant Examiner*—Antoinette T Spinks
(74) *Attorney, Agent, or Firm*—Greenblum & Bernstein, P.L.C.

(57) ABSTRACT

A digital camera generates a plurality of photograph image as a bracket image of an object. The digital camera comprises a setting processor that sets a plurality of steps for first and second parameters, a first bracket processor that obtains a plurality of intermediate images of the object based on each the step of the first parameter, and a second bracket processor that obtains a plurality of photograph images from each of the intermediate images based on each step of the second parameter.

26 Claims, 11 Drawing Sheets

FIG. 3

| | EXPOSURE (FIRST PARAMETER) | WHITE BALANCE (SECOND PARAMETER) |
|---|---|---|
| (1) | UNDER (−0.3EV) | PLUS CORRECTION (+1) |
| (2) | STANDARD (±0EV) | PLUS CORRECTION (+1) |
| (3) | OVER (+0.3EV) | PLUS CORRECTION (+1) |
| (4) | UNDER (−0.3EV) | NO CORRECTION (±0) |
| (5) | STANDARD (±0EV) | NO CORRECTION (±0) |
| (6) | OVER (+0.3EV) | NO CORRECTION (±0) |
| (7) | UNDER (−0.3EV) | MINUS CORRECTION (−1) |
| (8) | STANDARD (±0EV) | MINUS CORRECTION (−1) |
| (9) | OVER (+0.3EV) | MINUS CORRECTION (−1) |

DIGITAL CAMERA HAVING A BRACKETING CAPABILITY

BACKGROUND OF THE INVENTION

1. Field of the Invention

The present invention relates to a digital camera, more particularly, it relates to a digital camera capable of taking bracket images.

2. Description of the Related Art

Conventionally, it is known that a digital camera takes bracket images while setting gradual steps for a parameter of photograph condition e.g. exposure value, as shown in Japanese Unexamined Patent Publication (KOKAI) NO. 2003-87608. In this case, when a release button is pushed, an object is photographed continuously so as to obtain a plurality of photograph images, of which the compositions are substantially same, but which are taken under different photograph conditions from one another.

Sometimes it is difficult to judge the appropriate exposure value when the object is photographed. In this case, if the bracket images are taken, it is possible to choose the best image which is photographed under the appropriate exposure values among the plurality of photograph images after photographing. Namely, taking bracket images counteracts failure to set the correct photograph conditions e.g. exposure value.

Further, when an object moves fast, it is impossible for more than one photograph image having the same composition to be taken because the opportunity for photographing it is very short. However, if the bracket images are photographed, it is possible to obtain a plurality of images which are photographed under various photograph conditions and having the same composition. Namely, even if the object moves fast, a plurality of images having various characteristics can be obtained by taking bracket images.

In order to obtain the image having the characteristics the photographer desires, it is necessary to set the parameters for the photograph conditions precisely. However, if there are too many steps for setting only one parameter e.g. exposure value, it often happens that the image which the photographer desires is not obtained.

Accordingly, it is thought that bracket images should be photographed while setting several steps for one parameter and this photographing operation should be repeated after setting several steps for another parameter. In this method, another parameter has to be set manually by operating an operation device, and this operation takes a long time. Therefore, a good opportunity for photographing is sometimes lost, if the object moves fast. Further, the plurality of images, which are photographed as described above method, are not displayed on the camera monitor at the same time. In addition to this, the plurality of images are not associated with each other automatically. Therefore, it is difficult for users to select the most desirable image from the plurality of photograph images.

SUMMARY OF THE INVENTION

Therefore, an object of the present invention is to provide a digital camera, which can obtain bracket images based on a plurality of parameters for which several steps are set.

According to the present invention, there is provided a digital camera which generates a plurality of photograph images as bracket images of an object. The digital camera comprises a setting processor, a first bracket processor, and a second bracket processor. The setting processor sets a plurality of steps for first and second parameters. The first bracket processor obtains a plurality of intermediate images of the object based on each step of the first parameter. And the second bracket processor obtains a plurality of photograph images from each image of the intermediate images based on each step of the second parameter.

The digital camera preferably further comprises a monitor and a first display processor. The first display processor displays a display image on the monitor. The display image contains two or more than two of the photograph images.

The first display processor preferably displays the display image containing all the plurality of photograph images which are obtained by the second bracket processor.

The first display processor preferably divides a display field of the display image into vertical columns based on the number of steps of one parameter of the first and second parameters and horizontal rows based on the number of steps of one of the first and second parameters so as to generate a plurality of divided unit fields. Each photograph image is displayed in each divided unit field.

The first display processor preferably arranges the photograph images which are generated based on a single step of one parameter of the first and second parameters, in a vertical direction. Further, the first display processor arranges the photograph images which are converted based on a single step of another parameter of the first and second parameters, in a horizontal direction. The number of steps of the first parameter is preferably the same as the number of steps of the second parameter.

The first display processor rearranges the photograph images which are generated based on a single step of one parameter in a horizontal direction, and the photograph images which are generated based on a single step of another parameter, in a vertical direction.

The first display processor rearranges the photograph images according to a switch input for example.

The digital camera preferably comprises a distinction processor and deletion processor. The distinction processor distinguishes at least one of the photograph images from other photograph images. The deletion processor deletes the images which are distinguished by the distinction processor.

The digital camera can comprise a third bracket processor. In this case, the setting processor sets a plurality of step for a third parameter. The first bracket processor obtains a plurality of first intermediate images of the object based on each step of the first parameter. The second bracket processor obtains a plurality of second intermediate images from each first intermediate image based on each step of the second parameter. The third bracket processor obtains a plurality of photograph images from each of the second intermediate images based on each step of the second parameter.

The digital camera preferably comprises a monitor, and a second display processor that displays the display image on the monitor. In this case, the display image contains photograph images which are generated based on one step of a specific of the first, second, and third parameters. The specific parameter is changed according to a switch operation for example.

The first and second parameters are preferably selected from a plurality of selectable parameters, which include exposure value, a white balance value, a sharpness value, a saturation value, and a contrast value.

The first bracket processor is a photograph processor, and the second bracket processor is an image processor for example. The photograph processor continuously generates a plurality of frames of original image signals of a substantially the same object image, according to each step of the one parameter. The image processor converts the frames of the original image signals to a plurality of photograph images according to each step of another parameter.

The digital camera preferably comprises a photograph processor and an image processor, and both the first and second bracket processors are image processor for example. The photograph processor generates a frame of original image signals from an object. The image processor converts a frame of the original image signals to the intermediate images based on each step of first parameter, and further converts each of the intermediate images to a plurality of photograph images based on each step of the second parameter.

Another object of the present invention is to provide a digital camera that generates a plurality of photograph images as bracket images of an object. The digital camera comprises a setting processor that sets a plurality of steps for first and second parameters, and a bracketing processor that generates the plurality of photograph images of the object, based on each first multi-parameter of a plurality of the first multi-parameters. The first multi-parameter is a combination of each step of the first parameter and each step of the second parameter.

The setting processor can set a plurality of steps for a third parameter, and the bracketing processor converts the object image to a plurality of photograph images as bracket images, based on each second multi-parameter of a plurality of second multi-parameters. Each second multi-parameter is a combination of each the first multi-parameter and each step of the third parameter.

Another object of the present invention is to provide a bracket-image generating device which obtains a plurality of photograph images of an object. The device has first and second bracket processors, a monitor, and a display processor. The first bracket processor obtains a plurality of intermediate images of the object based on a first parameter. The first parameter has a plurality of steps, and each intermediate image is obtained based on each step of the plurality of steps of the first parameter. The second bracket processor obtains a plurality of photograph images from each the intermediate image, based on a second parameter. The second parameter has a plurality of steps, and the each photograph image is obtained based on each step of the plurality of steps of the second parameter. The display processor displays a display image on the monitor. The display image is divided into vertical columns and horizontal rows so as to generate a plurality of divided unit fields. The display processor displays each image of the photograph images in each the divided unit field.

BRIEF DESCRIPTION OF THE DRAWINGS

The objects and advantages of the present invention will be better understood from the following description, with reference to the accompanying drawings in which:

FIG. 3 shows a list for first and second parameters which are set up to three steps;

DESCRIPTION OF THE PREFERRED EMBODIMENTS

Figure 1:
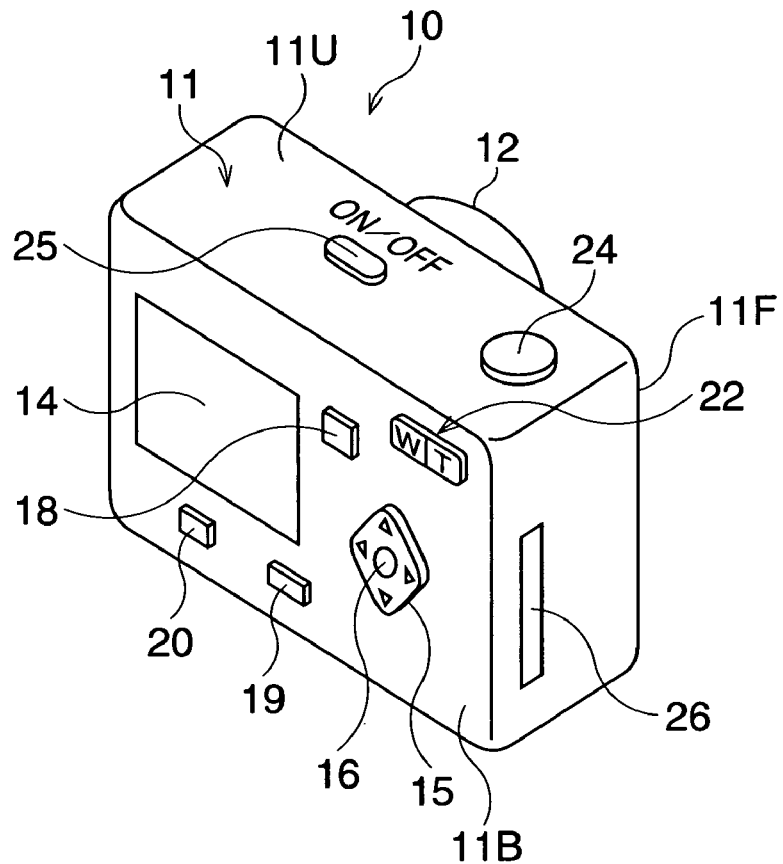
FIG. 1 shows a perspective view of a digital camera in a first embodiment.

The present invention will be described below with reference to the embodiments shown in the drawings.

FIG. 1 shows a perspective view of a digital camera in a first embodiment. The digital camera 10 is provided with a camera body 11 having an upper surface 11U, a back surface 11B, and a front surface 11F. The camera body 11 is provided with a photograph lens system 12 at the center of the front surface 1F. The camera body 11 is provided with a LCD monitor 14 at the left side of the back surface 11B.

Reflected light from an object, which is received at the photograph lens system 12, is converted to image signals, and then the image signals are converted to photograph image, which are displayed on the LCD monitor 14 as a still picture image.

A 4-way controller switch 15 is provided at the right side of the LCD monitor 14, and an OK switch 16 is provided at the center of the 4-way controller switch 15. A replay switch 18, a menu switch 19, and a bracket switch 20 are provided on the back surface 11B around the LCD monitor 14, a zoom switch 22 is provided on the back surface 11B above the 4-way controller switch 15.

A release button 24 is provided at the right side on the upper surface 11U, when the digital camera 10 is viewed from behind. A power switch 25 is provided at the center of the upper surface 11U. A card slot 26 is formed at one side surface of the camera body 11 in order to insert a PC card (a recording media, not shown in FIG. 1) in the camera body 11. Inside the card slot 26, a card connector (not shown in FIG. 1) for connecting the PC card is provided.

If the power switch 25 is pushed, the power supply to the digital camera 10 is switched on and then a mode of the digital camera 11 is set to an ordinary photograph mode. In the ordinary photograph mode, an ordinary photograph is carried out if the release button 24 is pushed. Further, in the ordinary photograph mode, if the bracket switch 20 is operated the mode of the digital camera 11 is changed to a bracket mode from the ordinary photograph mode.

In the ordinary photograph mode, when the object is photographed, the photographed image is captured and displayed as a single photograph image based on a plurality of parameters. On the other hand, in the bracket mode, when the object is photographed, a plurality of photograph images is obtained being substantially the same photograph image, where each photograph image has a different combination of step values for the plurality of parameters.

Figure 2:
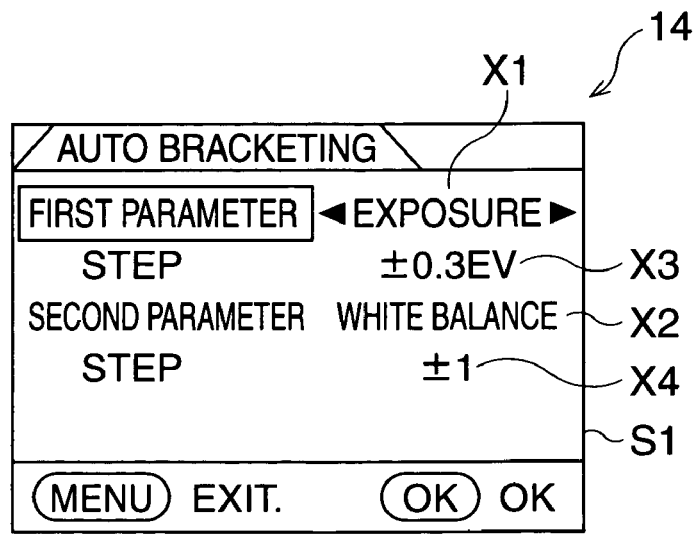
FIG. 2 shows a monitor which displays a setting image for selecting parameters.

FIG. 2 shows a monitor which displays a setting image in a condition setting mode. If the mode is changed to the bracket mode, first a condition setting mode is started. In the condition setting mode, a setting image SI is displayed on the monitor 14, and then first and second parameter X1 and X2 are selected from the plurality of selectable parameters according to the 4-way controller switch 15 input. The selectable parameters include selectable photograph parameters and selectable image process parameters. The selectable photograph parameters are for determining the conditions when the original image signals of the object image are generated, for example one could be the exposure value. The selectable image process parameters are for determining the conditions when the original image signals undergo image processes so as to obtain photograph images, for example they might be a white balance value, a sharpness value, a saturation value, and a contrast value.

Regarding selected first and second parameter X1 and X2 these values are set to three steps in this embodiment, and the differences between each step (the step levels) X3 and X4 are set up in the condition setting mode. If the OK switch 16 is pushed, the bracket mode is started in the state where the selected parameters X1 and X2 and set-up step levels X3 and X4 are set.

As shown in FIG. 2, when the image indicates that the step level X3 is ±0.3 EV, this means that each step for the first parameter X1 (exposure value) is set to −0.3, ±0, and +0.3 EV. The step level X3 (the difference between each step) is altered for example among (0.3-2.0) EV according to the 4-way controller switch 15 input. Similarly, when the image indicates that the step level X4 is ±1, it means that the each step for the second parameter X2 is −1, ±0, +1. The step level (difference between each step) is altered for example between (1-5) according to the 4-way controller switch 15 input. If the OK switch 16 is operated, the conditions in the bracket mode are set as the setting image SI is indicated. Namely, the exposure value and the white balance value are set as the first and second parameters and 0.3 and 1 are set as the step levels of the first and second parameters, if the setting image SI as shown in FIG. 2 is displayed.

FIG. 3 shows a list of first and second parameters which are set up. As described above, the first and second parameters which are set up to have three steps in the bracket mode. And then each step of the first parameter is combined with each step of the second parameter so as to form these combinations as a plurality of first multi-parameters (1)-(9). And then the photograph images are generated as bracket images of the object, based on each first multi-parameter of a plurality of first multi-parameters (1)-(9). Namely, a plurality of intermediate images is generated from the object based on each step of the first parameter. And the plurality of photograph images is generated from each of the intermediate images, based on each step of the second parameter.

As shown in FIG. 3, when the first and second parameters are determined as the exposure value and the white balance value, and each step is set to −0.3, ±0, +0.3 EV, and −1, ±0, +1, respectively, the nine multi-parameters (1)-(9) are formed by combining each step of the exposure value and each step of the white balance value. Namely, first the three intermediate images are formed based on exposure values −0.3, ±0, and +0.3 EV. Next, each image of the three intermediate images is converted to three photograph images based on the white balance values −1, ±0, and +1. In other words, nine photograph images in total are obtained.

Further, the exposure value means the degree of exposure, and the minus, the zero, and the plus mean "under-exposure", "standard exposure", and "over-exposure" respectively for the exposure value. Similarly the white balance value means the degree of correction for the white balance. The larger the absolute value thereof, the larger the corrected strength. And the plus, the zero, and minus mean "plus correction", "no correction", and "minus correction" respectively. Of course, the step values regarding the other parameters have the same meaning as those for the white balance.

Figure 4:
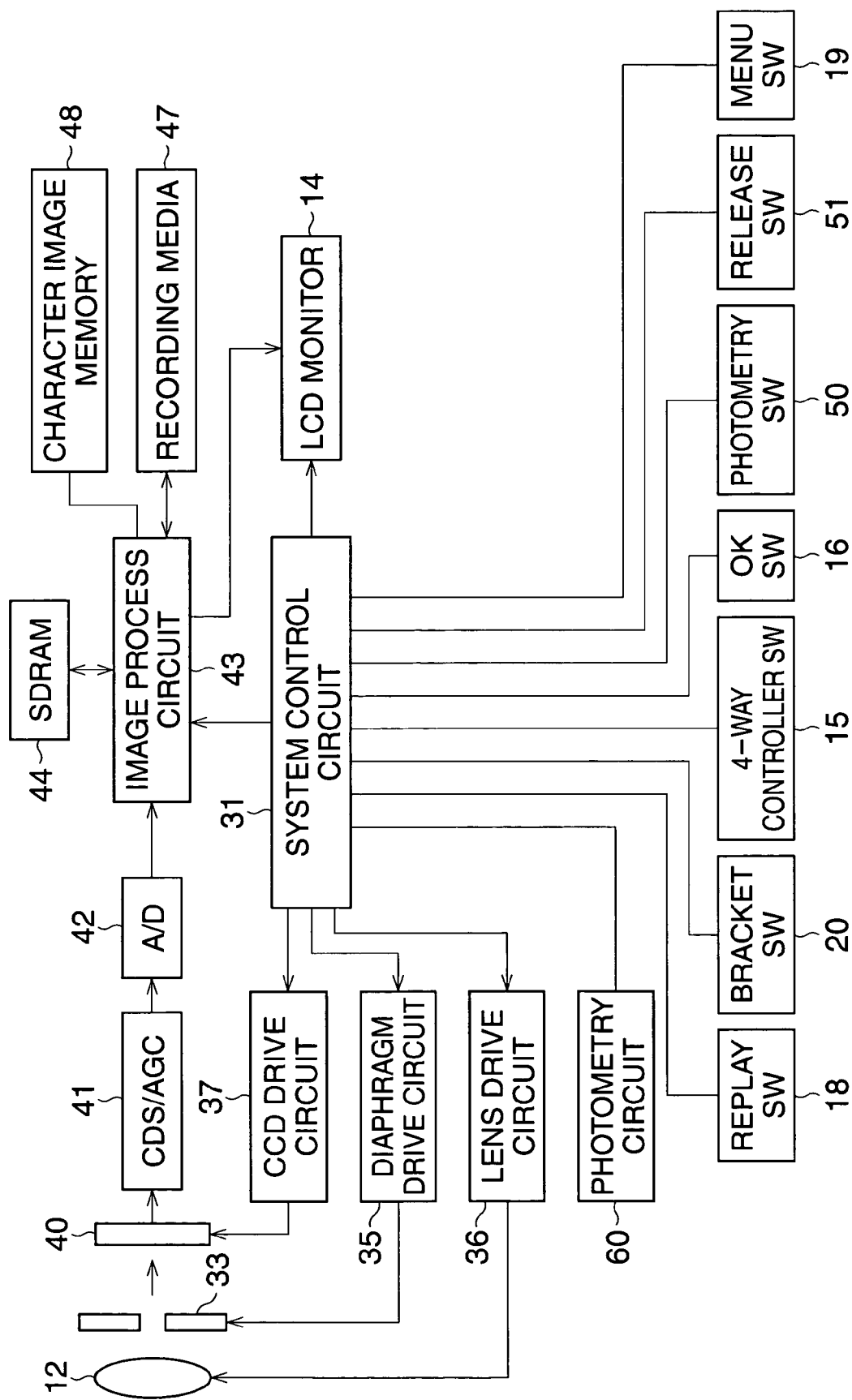
FIG. 4 is a block diagram of the digital camera in a first embodiment of this invention.

The working of the digital camera 10 in the bracket mode will be explained using FIG. 4. Hereinafter the case when the first and second parameters are the exposure value and the white balance respectively will be explained. The working of digital camera 10 is controlled by a system control circuit 31.

In the digital camera 10, the photographic optical system 12 includes the lens group. The position thereof for focusing is controlled by a lens drive circuit 36. A diaphragm 33 is disposed backward of the lens group, and is controlled by a diaphragm drive circuit 35 so that the aperture thereof can be adjusted.

A CCD (an imaging device) 40 is disposed on the optical axis of the optical system 12 and backward thereof, and is driven by the CCD drive circuit 37. At the imaging device 40, original image signals corresponding to the object image which is obtained by the optical system 12, are generated and are input to an image process circuit 43 as the digital signals through a correlated-double-sampling and auto-gain-control (CDS/AGC) circuit 41 and an A/D converter 42. The original image signals undergo many kinds of image processes at the image process circuit 43 so that the original image signals are converted to image data of the photograph image. The circuits 35, 36, 37, and 43 are connected to the system control circuit 31 and are controlled thereby. The system control circuit 31 further connects the switches so as to control the working of the digital camera 10 according to the signals input from the switches.

In the bracket mode, when the release button 24 is half-pushed, a photometry switch 50 is activated and the photometric value of the object is detected by a photometry circuit 60. After detecting, the photometric value is input to the system control circuit 31. As described above one of the first parameters is the exposure value. Therefore, the aperture value of the diaphragm 33 and the shutter speed of the CCD 40 are calculated based on the detected photometric value and the three steps of the exposure value which were set (for example −0.3, ±0, and +0.3 EV).

When the release button 24 is fully-pushed, a release switch 51 is activated and first, second, and third original image signals regarding first, second, and third frames respectively, are generated successively based on the three steps of the exposure value. Namely, when the release switch 51 is activated, the aperture of the diaphragm 33 is adjusted based on the first step exposure value (−0.3 EV) and the CCD 40 is exposed to the received light from the object through the photographic optical system 12 and the diaphragm 33 for the charge storing period (namely, the calculated shutter speed based on the first step exposure value (−0.3 EV)). Due to this exposure, the first image frame of the first original image signals are generated according to the received light. The first original image signals are output and input to the image process circuit 43 as digital signals through the CDS/AGC circuit 41 and the A/D converter 42. After the first image signals are output from the CCD 40, the CCD 40 is exposed again and the second frame of the second original image signals are generated from the received light based on the second step exposure value (0 EV), similar to the first original image signals. After, the second original image signals are output from the CCD 40, the third frame of the third image signals are generated at the CCD 40 based on the third step exposure value (+0.3 EV), similar to the first and second original image signals.

Further, as described above, the first, second, and third original image signals based on the under exposure (−0.3 EV), the standard exposure (0 EV), and the over exposure (+0.3 EV) are generated successively in this sequence. However, this sequence can be changed according to the switch input by the user for example.

At the image process circuit 43, the first, second, and third original image signals undergo many kinds of image processes including a white balance adjustment, a sharpness adjustment, a saturation adjustment, and a contrast adjustment. As described above, one of the first and second parameters is the white balance value, and the white balance value has three steps on levels (plus correction (+1), no correction (±0), and minus correction (−1)). Accordingly, the first original image signals undergo a white balance adjustment regarding each step level (+1, 0, −1) so that the first original image signals are converted to image data regarding three photograph images based on each step of the second parameter. On the other hand, the parameters regarding the sharpness value, the saturation value, and the contrast value are set at a single step or level. Therefore, while the first original image signals are converted to image data regarding all of the photograph images, the original image signals undergo the sharpness adjustment, the saturation adjustment, and the contrast adjustment under the same conditions. Similarly, the second and third original image signals are converted to image data. Due to this, the image data of the nine photograph images are generated.

In the case as described above, the first parameter is a photograph parameter and the second parameter is an image process parameter. Therefore, the control conditions for controlling the photograph processor including the photographic optical system 12, the diaphragm 33, and CCD 40 are changed according to steps on levels of the photograph parameters. Similarly, the conditions for controlling the image process circuit 43 (image processor) which carries out many kinds of image processes, are changed according to steps or levels of the photograph parameter.

However, both the first and second parameters can be image process parameters. The case when both the first and second parameters are the image process parameters (the white balance and the sharpness for example) is explained below. In this case, the control conditions for the photograph processor are the same. Therefore, when the release switch 51 is activated, only a single frame of original signals is generated at the CCD 40. Namely, when the release button 24 is half-pushed, the aperture value of the diaphragm 33 and shutter speed of the CCD 40 are calculated based on the photometric value which is detected by the photometry circuit 60 and the exposure value (for example 0 EV) which is set to a single step value. When the release button 24 is fully-pushed, the single frame of the original image signals is generated based on the aperture value and shutter speed which are calculated when the release button 24 is half-pushed. And then the original image signals are input to the image process circuit 43.

Three steps or levels are set for the first and second parameters (the white balance value and the sharpness value). Therefore, a single frame of the original image signals undergoes the white balance adjustment based on each step of the first parameter (the white balance value) so as to generate the image signals regarding the three intermediate images. The image signals regarding the three intermediate images further undergo the sharpness adjustment based on each step of the second parameter (the sharpness value) respectively so as to generate the image signals regarding nine photograph images. Further, while the original image signals are converted to the image signals regarding the nine photograph images, the image signals undergo the saturation adjustment, and the contrast adjustment and so on, of which parameters are set to single step or value.

The image signals regarding nine photograph images are sent to an SDRAM 44 and are temporarily stored therein as nine stored images without reducing the number of image pixels of the stored images. The image data of the stored images which are determined as the image to be recorded as described below are recorded in the recording media 47.

Figure 5:
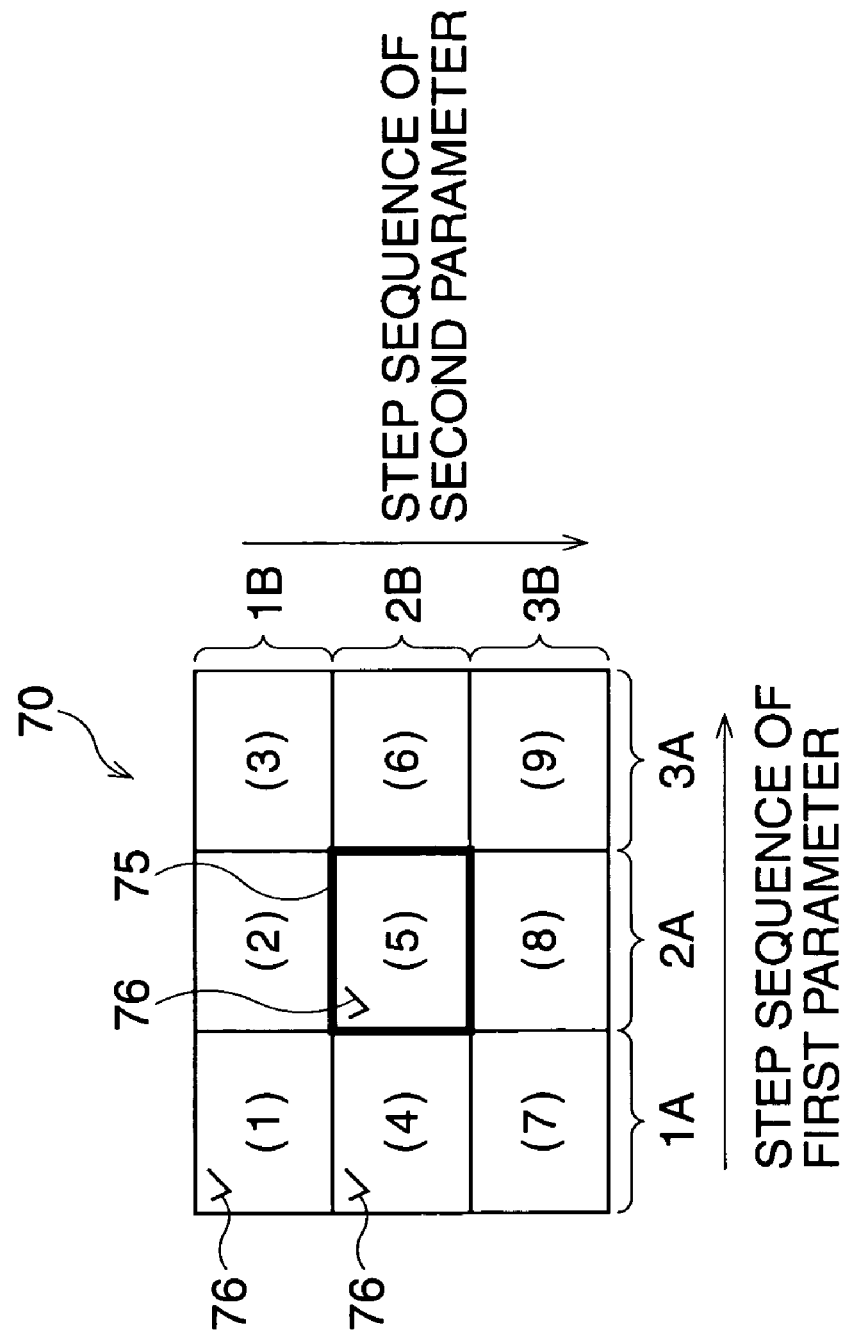
FIG. 5 shows a display image which is displayed on a monitor in the initial situation in the first embodiment.

On the other hand, the number of image pixels that are in the nine photograph images are reduced and then they are stored in the SDRAM 44 as nine unit display images. The image data regarding the nine unit display images is read from the SDRAM 44 and then the nine unit display images are synthesized at the image process circuit 43 so as to generate a single display image 70 which is displayed on the monitor 14 as shown in FIG. 5. A selected frame 75 and character 76 (as shown in FIG. 5) are read from a character image memory 48, and then are synthesized on the display image 70 at the image process circuit 43.

FIG. 5 shows a schematic view of the display image. The display image 70 has a substantially rectangular shape, and is displayed on the entire display field of the monitor 14. The nine unit display images (1)-(9) form a 3×3 matrix in the display image 70. Namely, the display field of the display image 70 is divided into three horizontal rows and three vertical columns which are the number of steps of the first and second parameters, so as to generate a plurality of divided unit fields. And then each unit display image (1)-(9) is displayed in each divided unit field. Further the unit display images (1)-(9) are generated based on the multi-parameters (1)-(9) respectively as shown in FIG. 3.

The unit display images are arranged from the left side to the right side of the display image 70 in the step sequence of the first parameter (from low exposure value to the high exposure value, −0.3 EV, 0 EV, and 0.3 EV). And the unit display images which are generated based on the same step of the first parameter are arranged in the same column (in the same vertical direction). Therefore, the unit display images (1), (4), and (7) which are generated based on the under exposure are arranged in a left column 1A. Similarly, the images (2), (5), and (8) are arranged in a center column 2A, and the images (3), (6) and (9) are arranged in a right column 3A.

Similarly, the unit display images are arranged from the top side to the bottom side of the display image 70 in the step sequence of the second parameter (from a high white balance value to the low value, +1, 0, and −1). And the unit display images which are generated based on the same step of the second parameter are arranged in the same row (in the same horizontal direction). Therefore, the unit display images (1), (2), and (3) which are generated based on the plus correction (+1) are arranged in a top row 1B. Similarly, the images (4), (5), and (6) are arranged in a center row 2B, and the images (7), (8), and (9) are arranged in a bottom row 3B.

Figure 6:
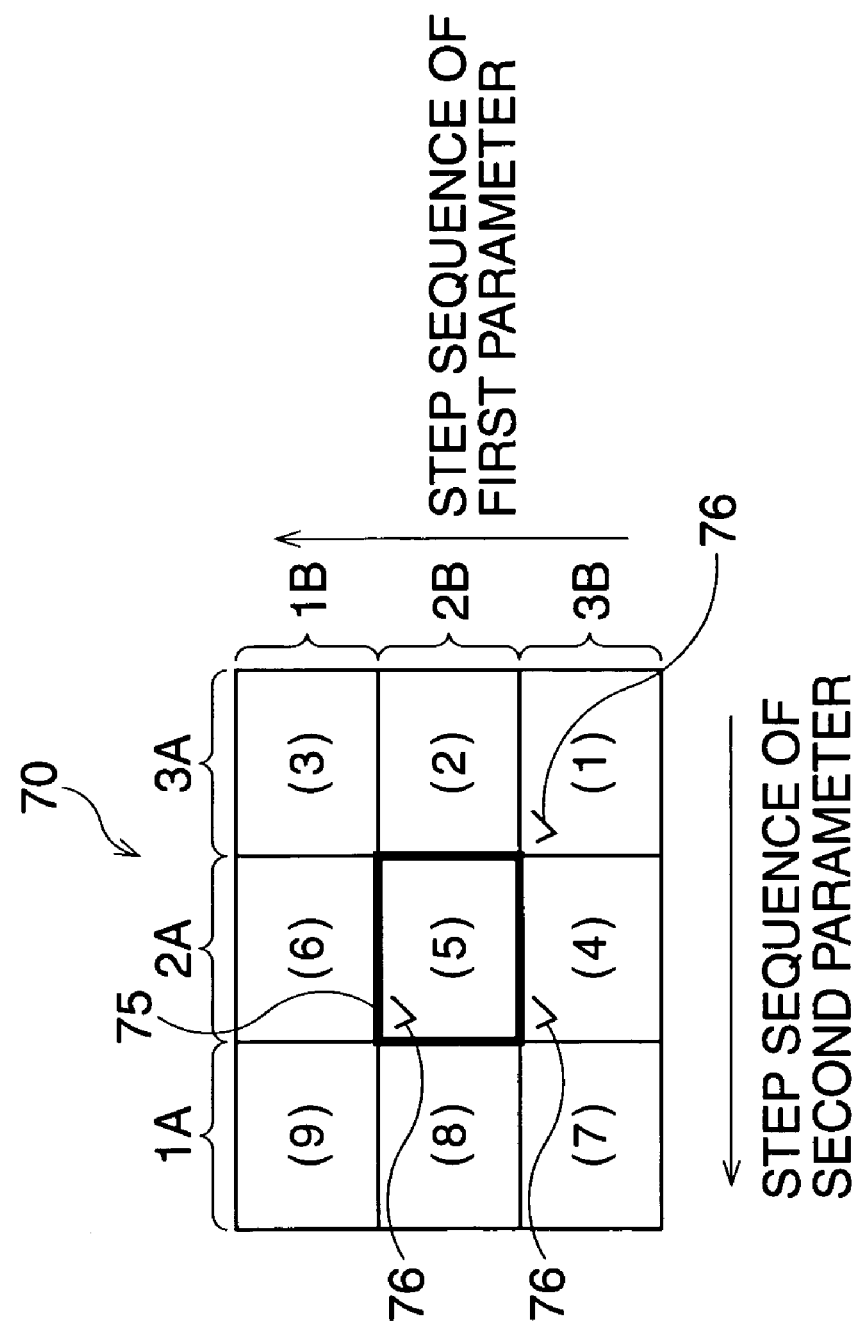
FIG. 6 shows a display image which is displayed on a monitor after rearranging the unit display images in the first embodiment.

If the display image 70 is displayed on the monitor 14, when the menu switch 19 is operated, the direction in which the unit display images (generated based on the same step of first and second parameters) are arranged, is changed. Namely, if the each unit display image is arranged as shown in FIG. 5, the each unit display image is rearranged as shown in FIG. 6, when the menu switch 19 is operated. Due to this, the unit display images generated based on the same step of the first parameter, are rearranged in a horizontal direction. Further the unit display images are arranged from the bottom side to the top side of the display image 70 in the step sequence of the first parameter. The unit display images generated based on the same step of the second parameter, are rearranged in a vertical direction. Further, the unit display images are arranged from the right side to the left side of the display image 70 in the step sequence of the second parameter. Furthermore, if each unit display image is arranged as shown in FIG. 6, the each unit display image is rearranged as shown in FIG. 5, when the menu switch 19 is input.

In this embodiment, the unit display image (5), which is generated based on the center steps of the first and second parameters, is always disposed at the center position of the display image 70. Due to this, the user always sees the unit display image which is generated based on the standard step values (for example 0 EV, and 0) for the first and second parameters, in the center of the display image 70.

The photograph images are deleted or recorded as described below. In the initial situation, all unit display images are set as the images to be recorded. As shown in FIG. 5, the selected frame 75 which surrounds one of the unit display images is displayed on the display image 70. The unit display image which the selected frame 75 surrounds is altered by operation of the 4-way controller switch 15. And when the OK switch 16 is operated, the unit display image, which the selected frame 75 surrounds, is determined as the image to be deleted. A check mark 76 in the form of a character, is applied to the unit image determined as the image to be deleted so as to distinguish the unit image determined as the image to be deleted from other displayed unit images. Further, the unit display image, which is surrounded by the selected frame 75 and which is set as the image to be deleted, is determined as the image to be recorded when the OK switch 16 is operated again.

More than one unit display image can be determined as an image to be deleted by operating the 4-way controller switch 15 and the OK switch 16. If the unit display images (1), (4), and (5) are determined as the images to be deleted, the check marks 76 are applied to these images (1), (4), and (5) as shown in FIG. 5. On the other hand, the unit display images which do not have the check mark 76 applied, are determined as the images to be recorded. When the bracket switch 20 is operated, the image data of the stored images corresponding to the unit display images (1), (4), and (5) which are determined as the images to be deleted are deleted from the SDRAM 44. At the same time, the image data of the stored images corresponding to the unit display images (2), (3), and (6)-(9) determined as the image to be recorded is recorded in the recording media 47. After this procedure, the bracket mode is finished.

Further, the photograph image can be recorded in the recording media 47 by other processes. For example, the digital camera 10 has a delete switch, and if the delete switch is operated, the stored image in the SDRAM 44 corresponding to the unit display image which the selected frame 75 surrounds, is deleted immediately. Further, a unit display image to which the check mark 76 is not applied, can be determined as the delete image, on the other hand, the unit display image to which the check mark 76 is applied, can be determined as the recoded image. Furthermore, whether the check mark 76 is applied to the image to be deleted or the image to be recorded can be set-up according to the switch operation.

As described above, it is easy for a user to obtain several photograph images which are generated from substantially the same object image while setting a plurality steps for several parameters. Further, these several photograph images can be displayed on the same display field of the monitor, therefore it is easy for the user to judge whether the photograph images are necessary or unnecessary. And the unnecessary images are deleted and the necessary images are recorded by simple operations in this embodiment.

Figure 7:
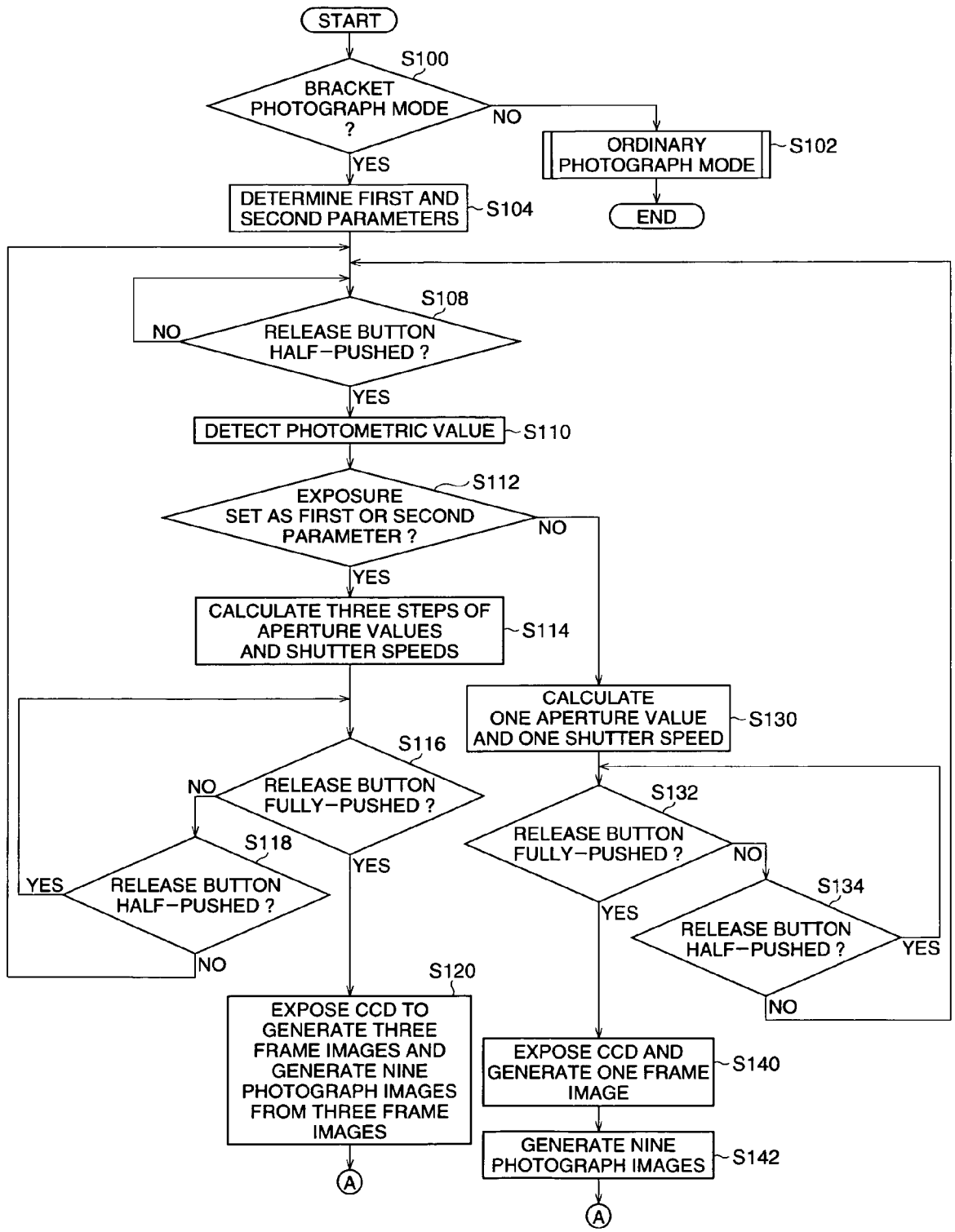
FIG. 7 is a flowchart showing a routine for the photograph mode.

FIG. 7 shows the routine for taking photographs. In the routine for taking a photograph, first whether the bracket switch 20 is operated is determined at step S100. If the bracket switch is operated, the digital camera 10 enters the bracket mode. If the bracket switch is not operated, the digital camera 10 enters the ordinary photograph mode in step S102.

If the digital camera 10 enters the bracket mode, first the condition setting mode as shown in FIG. 2 is started at step S104. In this mode, the first and second parameters are selected from a plurality of selectable parameters according to the switch inputs. And the steps of the first and second parameters are set according to the switch inputs. After this setting, whether the release button 24 is half-pushed is determined at step S108. If the release button 24 is not half-pushed, the routine waits at step S108. If the release button 24 is half-pushed, the photometric value of the object is detected at step S110. Next, whether the exposure value is selected as the first or second parameter at step S104 is determined at step S112. If the exposure value is selected as the first or second parameter, the routine goes to step S114.

If the first or second parameter is the exposure value, three frames of the original image signals are generated by the CCD 40 based on the three steps of the exposure value for substantially the same object image. Therefore, at step S114 the three steps of the aperture values and the shutter speeds are calculated based on the three steps of the exposure values and on the detected photometric value at step S110, in order to generate the three frames of original image signals by the CCD 40. Next, whether the release button is fully-pushed, half-pushed, or not pushed is determined at step S116 and S118. If the release button is not fully-pushed but the release button is continually half-pushed, the routine waits at step S116 and step 118. If the release button is neither fully-pushed nor half-pushed, the routine goes back to step S108 from step S118.

If the release button is fully-pushed, the object is photographed at step S120. Namely, the CCD 40 is exposed three times successively so as to generate the three frames of original image signals (three intermediate images) of substantially the same object image, based on the three aperture-values steps and the three shutter-speed steps which are calculated at step S114. The original image signals regarding each frame of three frames undergo many kinds of image processes. Specially, the original image signals regarding each frame undergo a specific image process which corresponds to the selected first or second parameter based on the three steps of the parameter set at step S104. Due to these image processes, the original image signals are converted to image data regarding nine photograph images.

On the other hand, if it is determined that the exposure value is not set to the first and second parameters the routine goes to step S130. A single frame of the original image signals is generated by the CCD 40 based on the value of the single exposure step. Therefore, at step S130 one aperture value and one shutter speed are calculated based on the value of the single exposure step and the detected photometric value. Next, whether the release button is fully-pushed, half-pushed, or not pushed is determined at step S132 and S134, similar to step S116 and step S118.

If the release button is fully-pushed, the object is photographed at steps S140 and S142. Namely, at step S140 the CCD 40 is exposed once so as to generate one frame of original image signals based on a single aperture value and a single shutter speed calculated at step S130. One frame of the original image signals undergoes many kinds of image processes at step S142. Specially, the original image signals undergo a specific image process corresponding to the first parameter, more precisely based on the three steps of the first parameter set at step S104, so that original image signals are converted to the image data regarding three intermediate images. In addition to this, the image data regarding three intermediate images undergoes a specific image process corresponding to the second parameter based on three steps of the second parameter. Due to these image processes, the original image signals are converted to image data regarding nine photograph images at step S142. The image data regarding nine photograph images which are generated at step S120 or S142 are temporarily stored in SDRAM 44.

Figure 8:
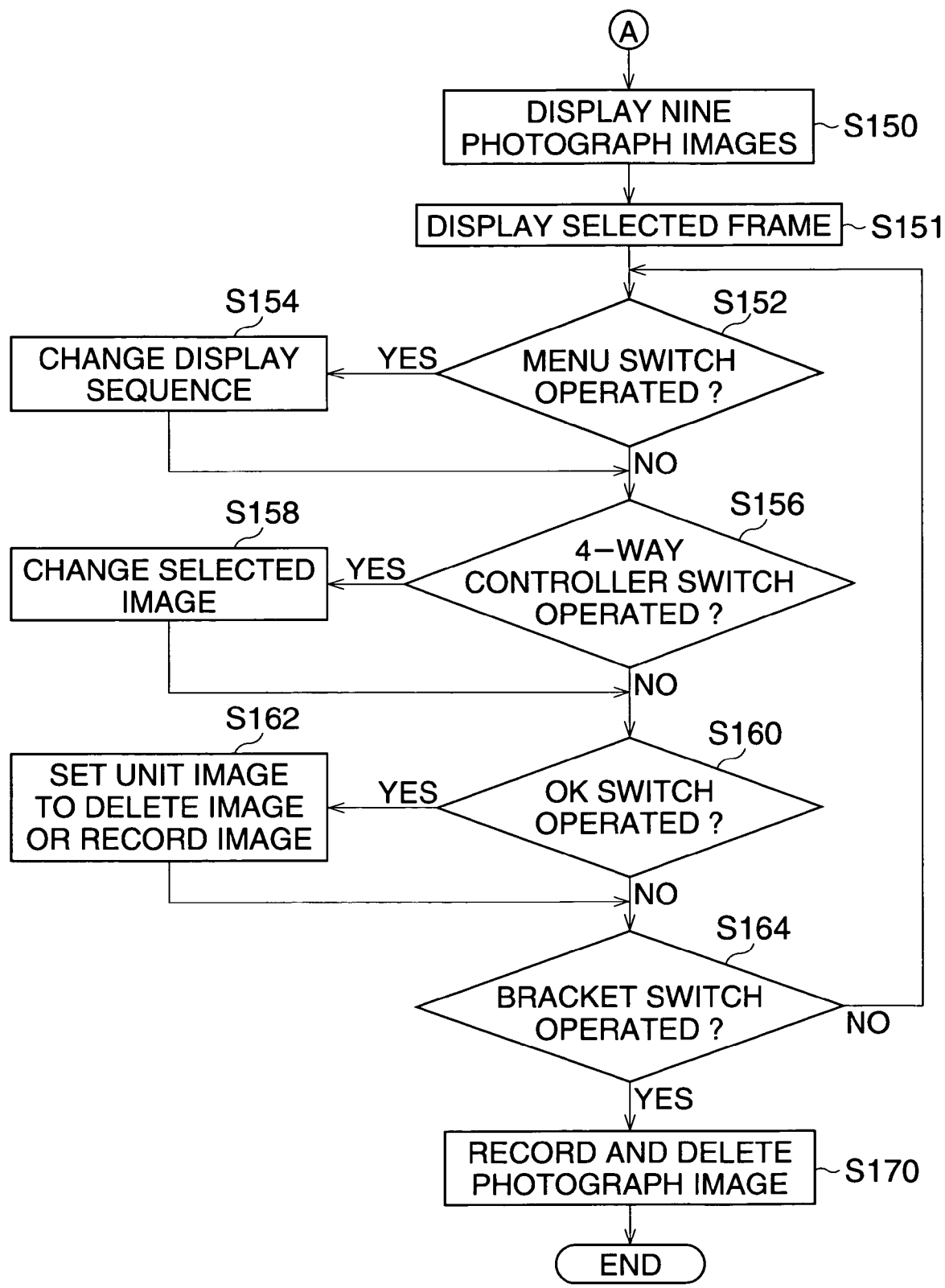
FIG. 8 is a flowchart showing routine for displaying the photograph images in the first embodiment.

FIG. 8 shows the routine for displaying the photograph image. At step S150, the image data regarding nine photograph images is read from the SDRAM 44, and then the display image 70 which includes the nine photograph images as the unit display images (1)-(9) is displayed on the monitor 14 as shown in FIG. 5. At step S151, the selected frame 75 is displayed on the displayed image 70 which surrounds the unit display image (5) which is disposed at the center of the display image 70 and the photograph image corresponding thereto is set to the selected image.

At step S152, whether the menu switch 19 is operated is determined. If it is determined that the switch 19 is operated, the display sequence of the unit display image (1)-(9) is changed at step S154. Namely, if the switch 19 is operated, the display sequence of the display image 70 is changed from that shown in FIG. 5 to that shown in FIG. 6, or from that shown in FIG. 6 to that shown in FIG. 5. At step S156, whether the 4-way controller switch 15 is operated is determined. If it is determined that the switch 15 is operated, the selected frame 75 is moved in a direction according to the operated part of the switch 15, and the selected image is changed to the photograph image corresponding to the unit display image which is surrounded by the selected frame 75.

At step S160, whether the OK switch 15 is operated is determined. If it is determined that the switch 16 is operated, the selected image is set as an image to be deleted or an image to be recorded at step S162. And a check mark 75 is applied to the unit display image which is set as an image to be deleted as shown in FIG. 5.

At step S164, whether the bracket switch 20 is operated is determined. If it is determined that the switch 20 is not operated, the routine repeats from step S152 to step S164. If it is determined that the switch 20 is operated, the routine goes to step S170. At step S170, the image data regarding a photograph image (stored in SDRAM 44 as the stored image) which is set as the image to be recorded is recorded in the recording media 47. On the other hand, the data regarding a photograph image which is set as the image to be deleted is deleted at step S170. When finishing step S170, the routine for taking a bracket photograph is finished and the digital camera enters the ordinary photograph mode.

In this embodiment, three steps for first and second parameters are set as described above. However, "n" steps for first and second parameters can be set ("n" is a natural number and is two or more than two). In this case, $n^2$ photograph images are generated as the bracket images, and the display image 70 (referring to FIG. 5) is divided into "n" horizontal rows and "n" vertical columns so as to generate the $n^2$ divided unit fields. Each unit display image corresponding to each photograph image is displayed in each of the divided unit fields. Similar to the embodiment as described above, the unit display images are arranged from the left side to the right side of the display image 70 in the step sequence of the first parameter, and the unit display images are arranged from the top side to the bottom side of the display image 70 in the step sequence of the second parameter in the initial situation.

Figure 9:
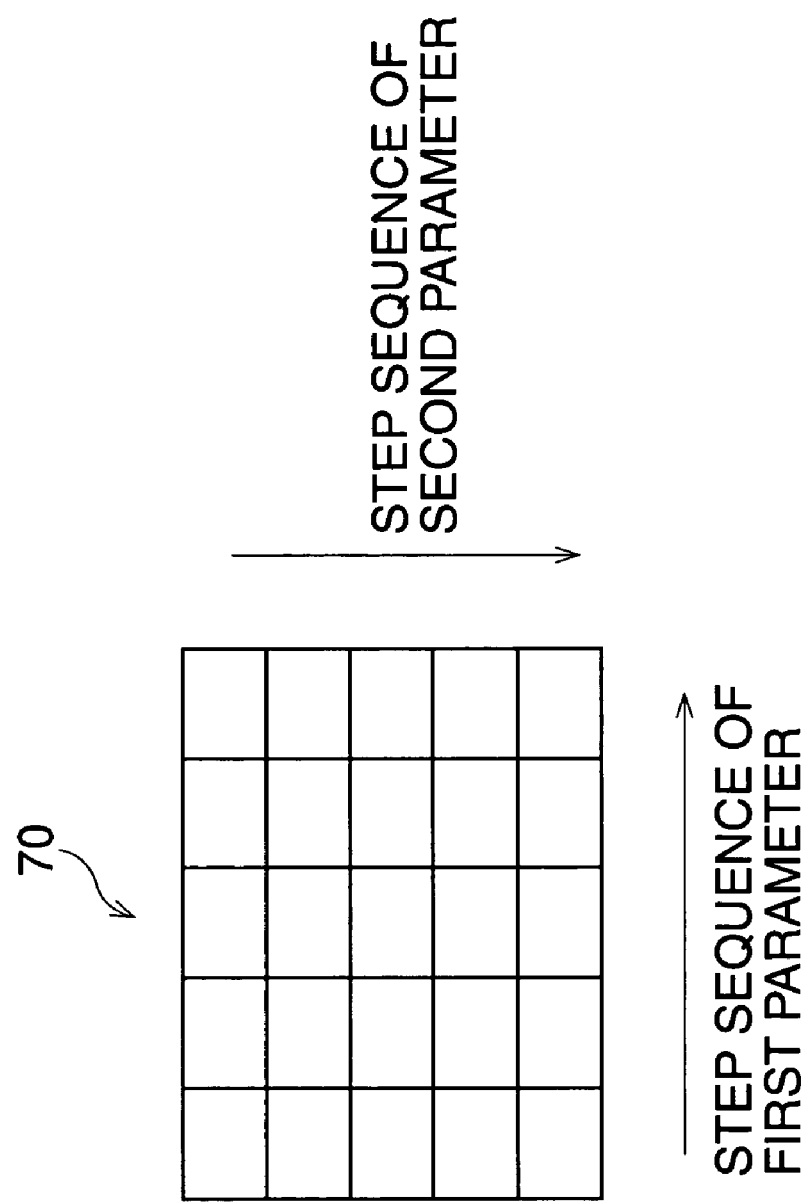
FIG. 9 shows a display image if the first and second parameters are set to five steps.

For example, if the steps for the first and second parameters are set to five steps, then twenty-five photograph images are generated of the object. And all of these photograph images are displayed on the display image 70 as the unit display images, as shown in FIG. 9.

In this embodiment, the number of steps of the first parameter is the same as the number of the steps of the second parameter. However, the number of the steps of the first parameter can be different from the number of the steps of the second parameter. In this case, if the display field of the monitor 14 is longer from side to side than an ordinary display field, the unit display images are arranged in the horizontal direction according to step sequence having the larger number of steps, so that each unit display image has a suitable size for a user to easily see.

Further, the number of steps of the first and second parameters is preferably an odd number. If it is an odd number, the photograph images which are generated based on the standard step of the first or second parameter are always displayed in the center row or column. In addition to this, the photograph image which is generated based on the standard step of both the first and second parameters is always displayed in the center of the display image 70. Due to this, the user can compare each photograph image easily.

Furthermore, in this embodiment, there is only one selectable photograph parameter, namely only the exposure value, however there can be two or more than two selectable photograph parameters, namely they might be the shutter speed and the aperture value of the diaphragm 33 for example instead of the exposure value. In this case, if both the shutter speed and the aperture value are set as the first and second parameters, the CCD 40 is exposed nine times so as to generate the nine frame images of original image signals when the release button is fully-pushed once.

In this embodiment, all photograph images are set as the images to be recorded in the initial situation. However, all photograph images can be set as images to be deleted in the initial situation. Of course, whether all photograph images are set as the images to be recorded or set as the images to be deleted in the initial situation is selected by a user.

Next, the second embodiment will be explained using FIGS. 10, 11, and 12. In the first embodiment, the first and second parameters are selected from the selectable parameters. However, in this embodiment, the first, second, and third parameters are selected from the selectable parameters. Hereinafter the case in which the first, second, and third parameters are the exposure value, the white balance value, and sharpness value respectively will be explained. In this case, the number of steps for the first, second, and third parameters is set to three, similar to the first embodiment for example. Each step of the first parameter is combined with each the step of the second parameter so as to form nine combinations as nine first multi-parameters. And each of the nine first multi-parameters is combined with each the step of the third parameter so as to form twenty-seven combinations as twenty-seven second multi-parameters. And then the photograph images are generated as bracket images of substantially the same object based on each multi-parameter of the twenty-seven second multi-parameters. Namely, the CCD 40 is exposed three times based on each step of the first parameter (the exposure value) so as to generate three first intermediate images from substantially the same object image, similar to the first embodiment. Next, the nine second intermediate images are generated from three first intermediate images based on each step of the second parameter (the white balance value) in the image process circuit 43. In addition to this, twenty-seven photograph images as bracket images are generated from the second intermediate images based on each the step of the third parameter (the sharpness value). The image signals regarding twenty-seven photograph images are temporarily stored in the SDRAM 44 as the stored images and as the unit display images, similar to the first embodiment.

It is difficult to display the twenty-seven unit display images in the display field of the monitor 14 at the same time. Therefore, in this embodiment, the twenty-seven unit display images are grouped into three groups, each group having nine unit display images. The nine unit display images in one group are synthesized at the image process circuit 43 into one display image. Due to these processes, the first, second, and, third display images 81, 82, and 83 which contain the nine unit display images are generated as shown in FIGS. 10 and 11.

The first, second, and third parameters are ranked. For each image of the display images 81, 82, and 83, the unit display images are generated based on each step of the first and second ranked parameters, and a single step of the third ranked parameter. And then the unit display images are arranged from the left side to the right side of the display image 81 in the step sequence of the first ranked parameter. And the unit display images are arranged from the top side to the bottom side of the display image 81 in the step sequence of the second ranked parameter.

The first, second, and third parameters are ranked into first, second, and third ranked parameters respectively in the initial situation. Therefore, in the initial situation, the unit display images which are generated based on the −0.3 EV, 0 EV, and +0.3 EV of the exposure value (the first parameter) are arranged in the columns 1A, 2A, and 3A respectively in each image of the display images 81, 82, and 83. Similarly, the unit display images which are generated based on the −1, 0, and +1 of the white balance value (the second prior) are arranged in the rows 1B, 2B, and 3B respectively in each image of the display images 81, 82, and 83. However, the unit display images are generated based on the same step of the sharpness value (the third parameter) in each display image 81, 82, and 83.

The first, second, and third parameters are ranked to first, second, and third ranked parameters respectively in the initial situation. However, the ranking of the parameters can be changed by operating the menu switch 19.

In the initial situation, the unit display image (5) which is generated based on the standard steps regarding all of the first, second, and third parameters is displayed on the monitor 14. Therefore, in the initial situation the second displayed image 82 is displayed on the monitor 14.

Furthermore, the selected frame 75 surrounds the unit display image (5) which is disposed in the center of the second image 82 and which is generated based the standard steps regarding the first, second, and third parameters in the initial situation.

Of course, which display image 81, 82, or 83 is displayed on the monitor 14 can be changed according to the input replay switch 18.

Figure 12:
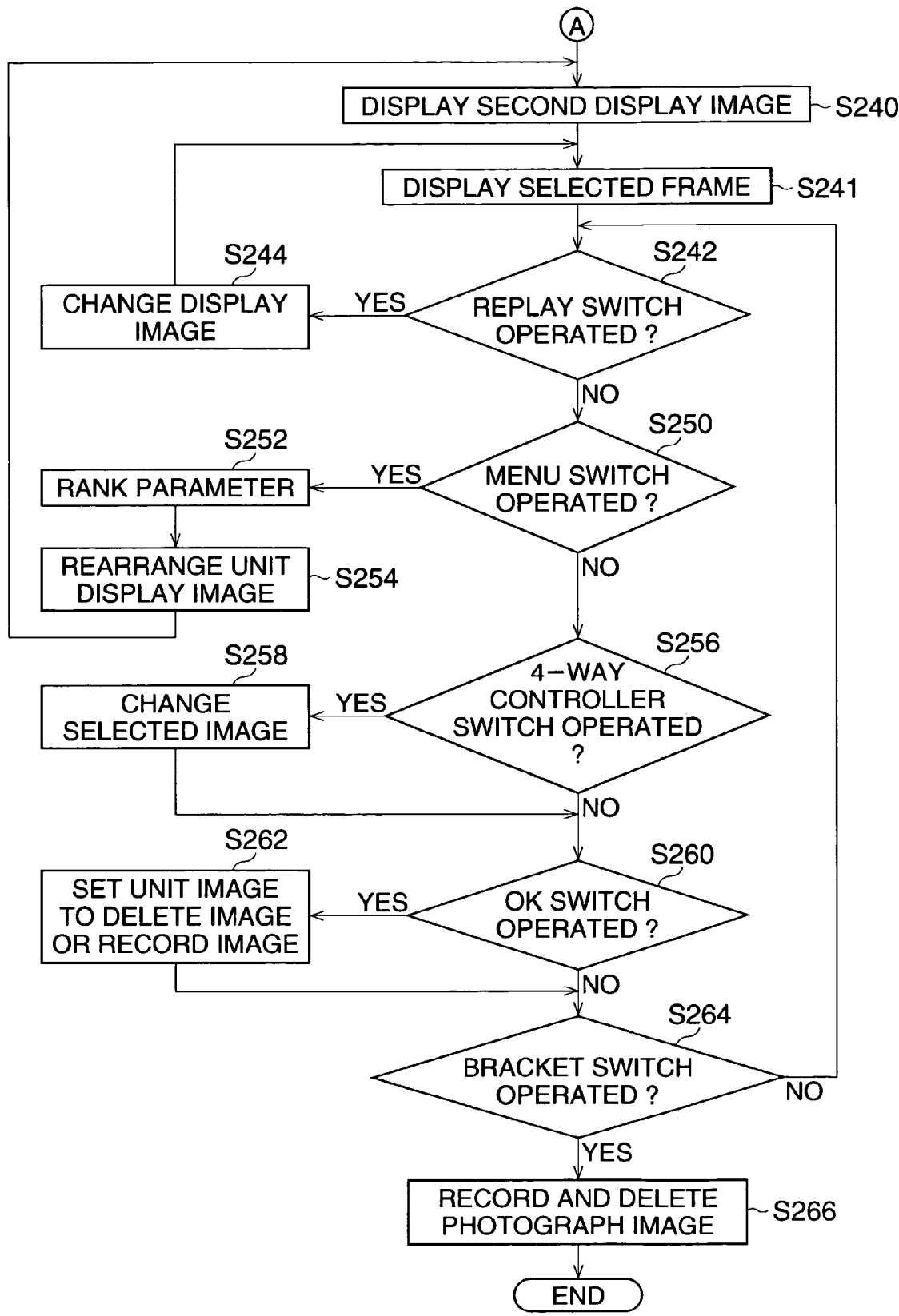
FIG. 12 is a flowchart showing a routine for displaying the photograph images in the second embodiment.

The FIG. 12 shows the routine for displaying the photograph image in the second embodiment. As described above, the twenty-seven photograph images are generated when the release button is pushed once in the bracket mode, and these twenty-seven photograph images are composed of one of the first, second, and third display images 81, 82, and 83.

Figure 10:
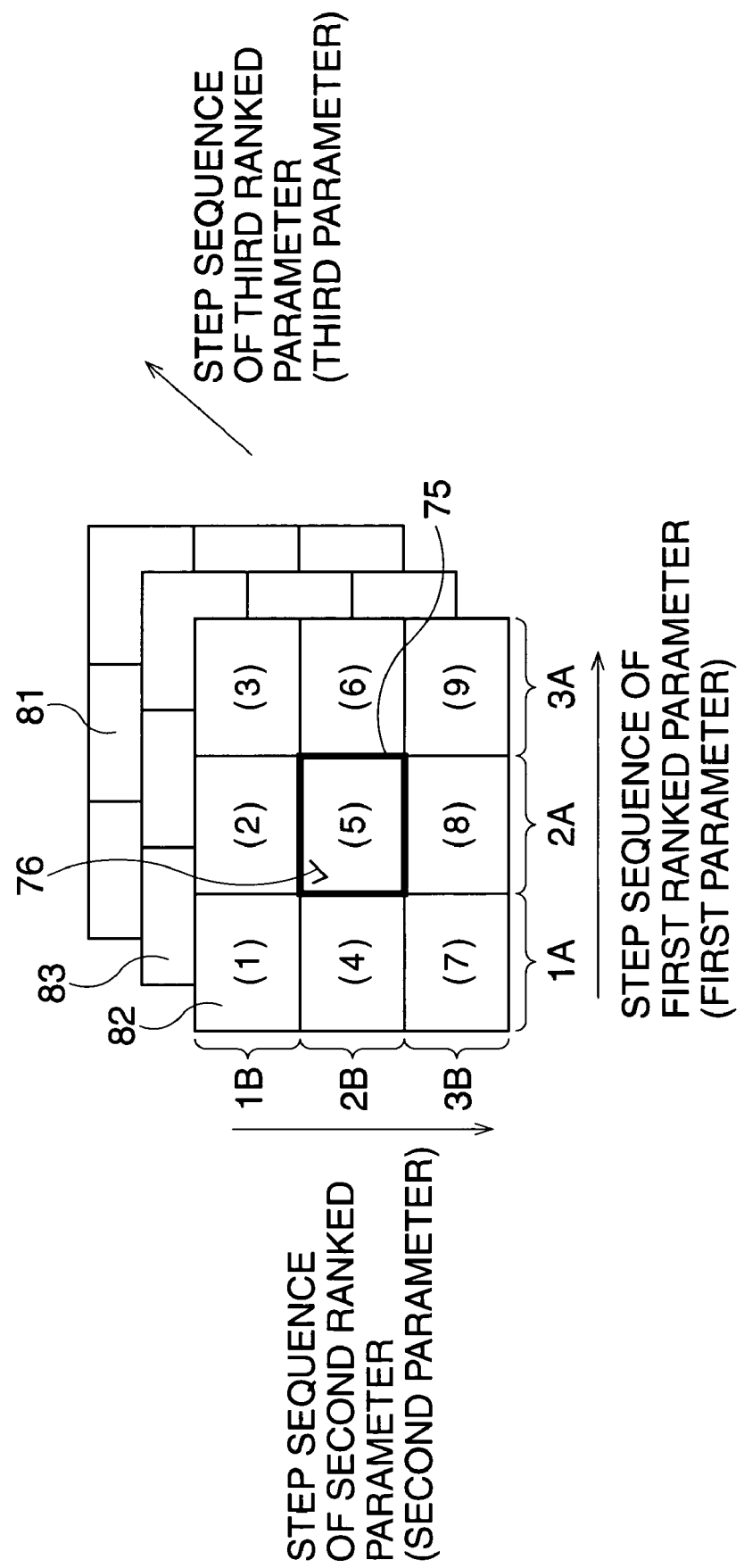
FIG. 10 shows display images in a second embodiment.
Figure 11:
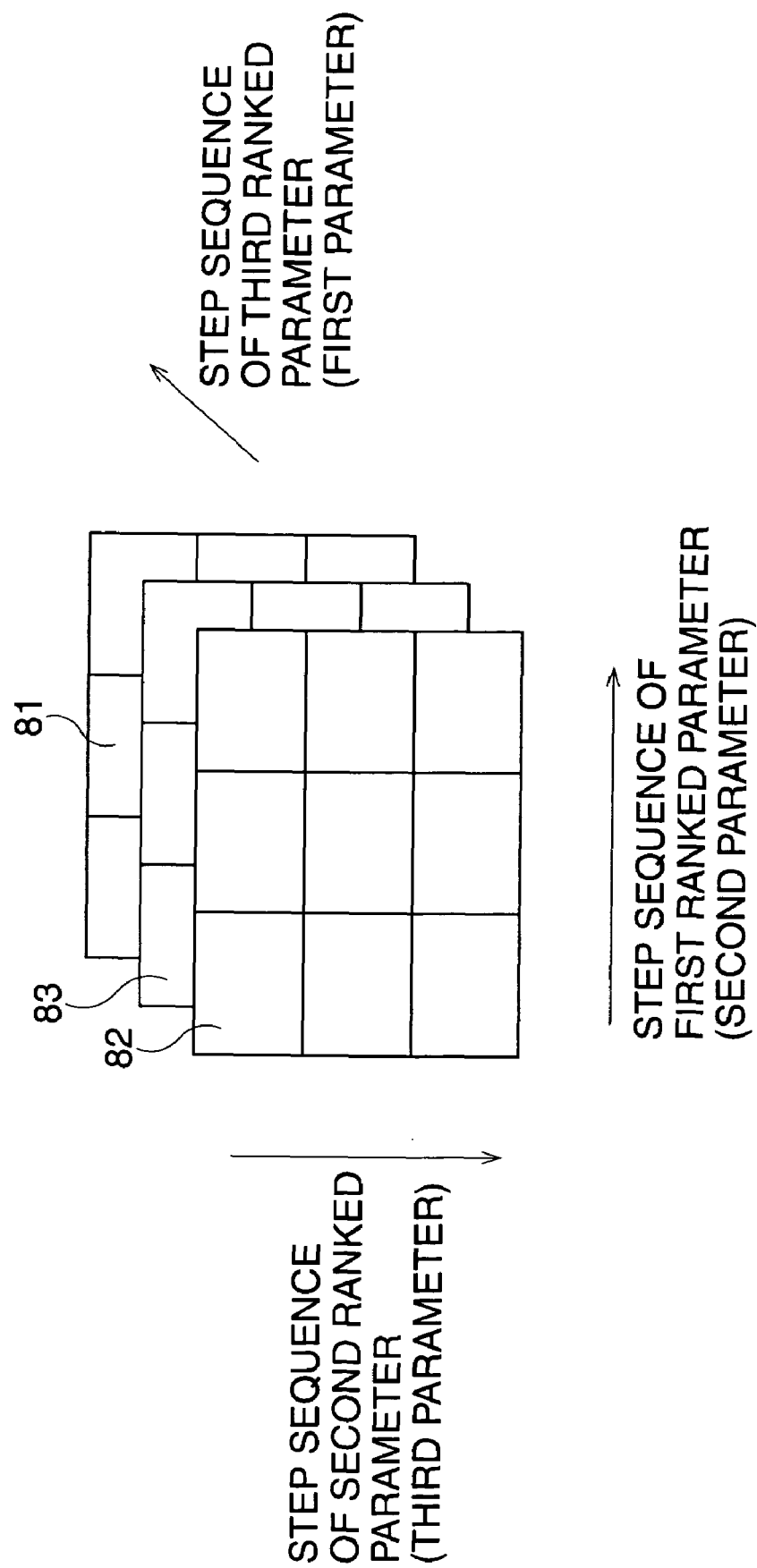
FIG. 11 shows display images after the ranking of parameters has been changed.

In this routine, the second display image 82 is displayed at step S240 at first, and then the center unit display image (5) is surrounded by the selected frame 75 at step S241 as shown in FIG. 10. At step S242, whether the replay switch 18 is operated is determined. If it is determined that the switch 18 is operated, the display image which is displayed on the monitor 14 is changed at step S244. Namely, if the display image which is displayed on the monitor 14 is the first display image 81 the display image is changed to the second display image 82. Similarly, it is changed from the second or third image 82 or 83 to the third or first image 83 or 81 if the second or third image 82 or 83 is displayed.

At step S250, whether the menu switch 19 is operated is determined. If it is determined that the switch 19 is operated, the ranking of the parameters is changed at step S252, namely the parameters which are ranked first, second, and third are changed to the third, first, and second ranked parameters respectively. After this step the twenty-seven unit display images are rearranged according to the ranks of the parameters at step S254. Namely, each image of the three display images 81, 82, and 83 contains the unit display images which are generated based on each step of the new first and second ranked parameters and single step of the new third ranked parameter. Next, the routine goes back to the step S240, and then the new second display image 82 is displayed on the monitor 14.

Namely, in the initial situation, each image of the three display images 81, 82, and 83 contains the nine unit display images which are generated based on each step of the first and second parameters, and a single step of the third parameter. And if the menu switch 19 is pushed once, the first, second, and third parameters are set to the third, first, and second ranked parameters respectively as shown in FIG. 11, therefore each image of the new three display images 81, 82, and 83 contains the nine unit display images which are generated based on each step of the second and third parameters, and a single step of the first parameter as shown in FIG. 11.

The routine from step S256 to step S266 is similar to that of the first embodiment, therefore these explanations are omitted.

As described above, the bracket images can be obtained of substantially the same object image based on each combination of steps of three parameters by a simple operation. Further, the bracket images are displayed on the monitor according to predetermined rules therefore the user can confirm each of the bracket images easily.

Of course, the number of parameters which are selected from the selectable parameters is changed according to the switch operation for example.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2004-250438 (filed on Aug. 30, 2004) which is expressly incorporated herein, by reference, in its entirety.

The invention claimed is:

1. A digital camera that generates a plurality of photograph images as bracket images of an object, comprising:
a setting processor that sets a plurality of steps for first and second parameters,
a first bracket processor that obtains a plurality of intermediate images of said object based on each said step of said first parameter,
a second bracket processor that obtains a plurality of photograph images from each image of said intermediate images based on each said step of said second parameter, a monitor, and a first display processor that displays a display image on said monitor, said display image containing two or more than two of said photograph images, wherein said first display processor divides a display field of said display image into vertical columns based on the number of said steps of one parameter of said first and second parameters, and horizontal rows based on the number of said steps of another parameter of said first and second parameters so as to generate a plurality of divided unit fields, each said photograph image being displayed in each said divided unit field.

2. A digital camera according to claim 1, wherein said first display processor displays said display image containing all said plurality of photograph images which are obtained by said second bracket processor.

3. A digital camera according to claim 1, wherein said first display processor arranges said photograph images, generated based on a single step of one parameter of said first and second parameters, in a vertical direction.

4. A digital camera according to claim 3, wherein said first display processor arranges said photograph images, generated based on a single step of another parameter of said first and second parameters, in a horizontal direction.

5. A digital camera according to claim 4, wherein the number of said steps of said first parameter is the same as the number of said steps of said second parameter.

6. A digital camera according to claim 4, wherein said first display processor rearranges said photograph images, generated based on said single step of said one parameter, in a horizontal direction, and said photograph images generated based on said single step of said another parameter, in a vertical direction, on said display field.

7. A digital camera according to claim 6, wherein said first image display processor rearranges said photograph images according to a switch operation.

8. A digital camera according to claim 1, wherein said digital camera further comprises:

a distinction processor that distinguishes at least one of said photograph images from other said photograph images.

9. A digital camera according to claim 8, wherein said digital camera further comprises:

a deletion processor that deletes said images which are distinguished by said distinction processor.

10. A digital camera according to claim 1, wherein said digital camera comprises a third bracket processor, said setting processor setting a plurality of steps for a third parameter, said first bracket processor obtaining a plurality of first intermediate images of said object based on each said step of said first parameter, said second bracket processor obtaining a plurality of second intermediate images from each said first intermediate image based on each said step of said second parameter, and said third bracket processor obtaining a plurality of photograph images from each said second intermediate image based on each said step of said third parameter.

11. A digital camera according to claim 10, wherein said digital camera further comprises:

a second display processor that displays a display image on said monitor, said display image containing photograph images which are generated based on a single step of a specific parameter of said first, second, and third parameters.

12. A digital camera according to claim 11, wherein said specific parameter is changed according to a switch operating.

13. A digital camera according to claim 1, wherein said first and second parameters are selected from a plurality of selectable parameters.

14. A digital camera according to claim 13, wherein said plurality of selectable parameters include an exposure value, a white balance value, a sharpness value, a saturation value, and a contrast value.

15. A digital camera according to claim 1, wherein said first bracket processor is a photograph processor, and said second bracket processor is an image processor, and said photograph processor continuously generates a plurality of frames of original image signals of substantially the same object image according to each said step of said one parameter, and said image processor converts said frames of said original image signals to a plurality of said photograph images according to each said step of said another parameter.

16. A digital camera according to claim 1, comprising a photograph processor and an image processor, and both said first and second bracket processors being image processors, wherein said photograph processor generates a frame of original image signals from an object, and said image processor converts said frame of said original image signals to said intermediate images based on each said step of said first parameter, and further converts each said intermediate image to said plurality of photograph images based on each said step of said second parameter.

17. A bracket-image generating device, which obtains a plurality of photograph images of an object, comprising:

a first bracket processor that obtains a plurality of intermediate images of said object based on a first parameter, said first parameter having a plurality of steps, said each intermediate image being obtained based on each step of said plurality of steps of said first parameter, a second bracket processor that obtains a plurality of photograph images from each said intermediate image, based on a second parameter, said second parameter having a plurality of steps, said each photograph image being obtained based on each step of said plurality of steps of said second parameter, a monitor, and a display processor that displays a display image on said monitor, said display image being divided into vertical columns and horizontal rows so as to generate a plurality of divided unit fields;

wherein said display processor displays each image of said photograph images in each said divided unit field.

18. A device according to claim 17, wherein said display processor arranges said photograph images, generated based on a single step of one parameter of said first and second parameters, in a vertical direction, and said photograph images, generated based on a single step of another parameter of said first and second parameters, in a horizontal direction.

19. A device according to claim 18, wherein said display processor rearranges said photograph images, generated based on said single step of said one parameter, in a horizontal direction, and said photograph images generated based on said single step of said another parameter, in a vertical direction, on said display field.

20. A device according to claim 17, wherein said device comprises a third bracket processor, said first bracket processor obtaining a plurality of first intermediate images of said object based on said first parameter, said first parameter having a plurality of steps, said each first intermediate image being obtained based on each step of said plurality of steps of said first parameter, said second bracket processor obtaining a plurality of second intermediate images from each said first intermediate image, based on said second parameter, said second parameter having a plurality of steps, said each second intermediate image being obtained based on each step of said plurality of steps of said second parameter, said third bracket processor obtaining a plurality of photograph images from each said second intermediate image, based on a third parameter, said third parameter having a plurality of steps, said photograph image being obtained based on each step of said plurality of steps of said third parameter.

21. A device according to claim 20, wherein said display image contains photograph images which are generated based on a single step of a specific parameter of said first, second, and third parameters.

22. A digital camera according to claim 21, wherein said specific parameter is changed according to a switch operating.

23. A digital camera that generates a plurality of photograph images as bracket images of an object, comprising:
   a setting processor that sets a plurality of steps for first and second parameters,
   a first bracket processor that obtains a plurality of intermediate images of said object based on each said step of said first parameter,
   a second bracket processor that obtains a plurality of photograph images from each image of said intermediate images based on each said step of said second parameter,
   a third bracket processor,
   a monitor,
   a first display processor that displays a display image on said monitor, said display image containing two or more than two of said photograph images,
   wherein said first display processor divides a display field of said display image into vertical columns based on the number of said steps of one parameter of said first and second parameters, and horizontal rows based on the number of said steps of another parameter of said first and second parameters so as to generate a plurality of divided unit fields, each said photograph image being displayed in each said divided unit field,
   wherein said setting processor sets a plurality of steps for a third parameter,
   said first bracket processor obtains a plurality of first intermediate images of said object based on each said step of said first parameter,
   said second bracket processor obtains a plurality of second intermediate images from each said first intermediate image based on each said step of said second parameter,
   said third bracket processor obtains a plurality of photograph images from each said second intermediate image based on each said step of said third parameter, and
   said display image contains photograph images which are generated based on a single step of said third parameter.

24. A digital camera that generates a plurality of photograph images as bracket images of an object, comprising:
   a setting processor that sets a plurality of steps for first and second parameters,
   a first bracket processor that obtains a plurality of intermediate images of said object based on each said step of said first parameter, and
   a second bracket processor that obtains a plurality of photograph images from each image of said intermediate images based on each said step of said second parameter,
   wherein said first and second parameters are selected from a plurality of selectable parameters.

25. A digital camera that generates a plurality of photograph images as bracket images of an object, comprising:
   a setting processor that sets a plurality of steps for first and second parameters,
   a first bracket processor that obtains a plurality of intermediate images of said object based on each said step of said first parameter, and
   a second bracket processor that obtains a plurality of photograph images from each image of said intermediate images based on each said step of said second parameter,
   wherein said first bracket processor is a photograph processor, and said second bracket processor is an image processor, and
   said photograph processor continuously generates a plurality of frames of original image signals of substantially the same object image according to each said step of one parameter of said first and second parameters, and
   said image processor converts said frames of said original image signals to a plurality of said photograph images according to each said step of another parameter of said first and second parameters.

26. A digital camera, generating a plurality of photograph images as bracket images, of an object, comprising:
   a setting processor that sets a plurality of steps for first and second parameters,
   a first bracket processor that obtains a plurality of intermediate images of said object based on each said step of said first parameter,
   a second bracket processor that obtains a plurality of photograph images from each image of said intermediate images based on each said step of said second parameter,
   a photograph processor, and
   an image processor, both of said first and second bracket processors being image processors,
   wherein said photograph processor generates a frame of original image signals from an object, and
   said image processor converts said frame of said original image signals to said intermediate images based on each said step of first parameter, and further converts each said intermediate image to said plurality of photograph images based on each said step of said second parameter.

* * * * *